United States Patent
Kumawat et al.

(10) Patent No.: US 11,301,856 B2
(45) Date of Patent: Apr. 12, 2022

(54) METHOD AND SYSTEM FOR TRANSACTION AUTHORIZATION VIA CONTROLLED BLOCKCHAIN

(71) Applicant: MASTERCARD INTERNATIONAL INCORPORATED, Purchase, NY (US)

(72) Inventors: Jaipal Singh Kumawat, Rajasthan (IN); Komalpreet Kaur, Delhi (IN); Vipul Mehrotra, Uttar Pradesh (IN); Ved Pratap Singh Chauhan, Uttar Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 647 days.

(21) Appl. No.: 15/988,026

(22) Filed: May 24, 2018

(65) Prior Publication Data

US 2019/0362352 A1     Nov. 28, 2019

(51) Int. Cl.
*G06Q 20/40*     (2012.01)
*G06Q 20/38*     (2012.01)
(Continued)

(52) U.S. Cl.
CPC ....... *G06Q 20/4016* (2013.01); *G06Q 20/382* (2013.01); *H04L 9/0637* (2013.01); *H04L 9/3247* (2013.01); *H04L 2209/38* (2013.01)

(58) Field of Classification Search
None
See application file for complete search history.

(56) References Cited

U.S. PATENT DOCUMENTS

| | | |
|---|---|---|
| 8,290,838 B1 | 10/2012 | Thakur et al. |
| 2008/0140516 A1* | 6/2008 | Silbernagl .............. G06Q 20/18 705/13 |

(Continued)

OTHER PUBLICATIONS

Notification of Transmittal of the International Search Report (Form PCT/ISA/220 and PCT/ISA/210) and the Written Opinion of the the International Searching Authority (Form PCT/ISA/237) dated Aug. 27, 2019, by the European Patent Office in corresponding International Application No. PCT/US2019/024471. (13 pages).

*Primary Examiner* — Neha Patel
*Assistant Examiner* — Nicholas K Phan
(74) *Attorney, Agent, or Firm* — Buchanan Ingersoll & Rooney PC (57) ABSTRACT

A method for processing an electronic payment transaction includes: storing an account profile including a plurality of account numbers; receiving a first authorization request for a payment transaction that includes a first account number of the plurality of account numbers, a first time, and a first location; processing the first payment transaction; receiving a second authorization request for a different transaction including a second primary account number of the plurality of account numbers, a second time, and a second location, where the second account number is associated with a different issuer than the first account number; determining a likelihood of fraud based on the first time and location and the second time and location; and forwarding the second authorization request to the different issuer if the likelihood of fraud is below a threshold, or transmitting an authorization response indicating decline if the likelihood of fraud is above the threshold.

16 Claims, 5 Drawing Sheets

(51) Int. Cl.
*H04L 9/06* (2006.01)
*H04L 9/32* (2006.01)

(56) References Cited

U.S. PATENT DOCUMENTS

| | | | |
|---|---|---|---|
| 2010/0125546 A1* | 5/2010 | Barrett | G06Q 10/067 |
| | | | 707/607 |
| 2017/0004486 A1* | 1/2017 | Dhala | G06Q 20/34 |
| 2017/0132625 A1 | 5/2017 | Kennedy | |
| 2017/0140385 A1 | 5/2017 | Dobson et al. | |
| 2017/0169421 A1 | 6/2017 | Kohli | |
| 2017/0308898 A1 | 10/2017 | Kolotinsky et al. | |
| 2019/0303622 A1* | 10/2019 | Versteeg | H04L 9/3239 |
| 2020/0250676 A1* | 8/2020 | Sierra | H04L 9/0637 |
| 2020/0267153 A1* | 8/2020 | Kang | H04W 12/0023 |

\* cited by examiner

METHOD AND SYSTEM FOR TRANSACTION AUTHORIZATION VIA CONTROLLED BLOCKCHAIN

FIELD

The present disclosure relates to the processing of electronic payment transactions, specifically the use of an authorization for a payment transaction funded by a transaction account issued by a first issuer in the authorization of a second payment transaction funded by a different transaction account issued by a second issuer, where the transaction accounts are associated through biographical information.

BACKGROUND

Generally, electronic payment transactions are processed using a system where an issuing institution that issued a transaction account used to fund the transaction will approve or decline the transaction. In many cases, the determination to approve or decline the transaction is made based on, among other criteria, transaction history of that transaction account. For instance, if a consumer wants to make a purchase at the same merchant and the same time and day of the week as the consumer has made several times prior using the same transaction account, the issuing institution may be more likely to approve the transaction having the impression that it is the genuine consumer. Similarly, if a transaction is conducted in one country and then a second transaction attempted a short time after in a different country a significant distance away, the issuing institution may likely decline the transaction due to fraud concerns.

Such considerations can be useful in the approval and denial of electronic payment transactions. However, these kinds of considerations are only as useful as the data available to the issuing institutions. In cases where a consumer may have multiple transaction accounts that are used to fund electronic payment transactions, the transaction history available to any single issuer may be incomplete and thus ineffective for determining approval or denial based thereon. In addition, in traditional systems, it may be impossible due to privacy regulations and restrictions for one issuing institution to obtain transactional information for a consumer from a different issuing institution. Furthermore, due to inexperience handling such data, issuing institutions may be inefficient, if not incapable, of taking such data into account when determining approval and denial of payment transactions. That is, a business need creates a technical challenge to achieve the desired effect that avoids the technical problems identified above for instance.

Thus, there is a need for a technological system that is configured to identify, while maintaining consumer security and privacy, transactional history for a consumer across multiple issuing institutions for use thereof in determining approval or denial of an attempted electronic payment transaction.

SUMMARY

The present disclosure provides a description of systems and methods for processing an electronic payment transaction. A processing system identifies transaction accounts issued to the same consumer from different issuing institutions via the use of biographical data. Transactions are tracked across the issuing institution such that, when a new authorization request is received, the past transaction history, independent of issuing institution, is taken into account. The processing system is configured to decline transactions on behalf of the issuing institutions if the transactional history is such that fraud is detected, resulting in a more efficient processing system where fraud can be prevented in instances where the issuing institution would have been unable to detect such fraud, and in a manner that reduces network communications and processing time expended by issuing institutions.

A method for processing an electronic payment transaction includes: storing, in an account database of a processing server, an account profile, wherein the account profile includes at least a plurality of primary account numbers and one or more biographical data values, where each of the plurality of primary account numbers is associated with a transaction account and the one or more biographical data values are associated with each of the transaction accounts related to the plurality of primary account numbers; receiving, by a receiving device of the processing server, a first authorization request for a first payment transaction, wherein the first authorization request is formatted according to one or more standards and includes a plurality of data elements configured to store transaction data including at least a first primary account number of the plurality of primary account numbers, a first transaction time, and a first geographic location; processing, by the processing server, the first payment transaction; receiving, by the receiving device of the processing server, a second authorization request for a second payment transaction from an external system, wherein the second authorization request is formatted according to the one or more standards and includes a plurality of data elements configured to store transaction data including at least a second primary account number of the plurality of primary account numbers, a second transaction time, and a second geographic location, where the second primary account number is associated with a transaction account issued by a different issuer than a transaction account associated with the first primary account number; determining, by the processing server, a likelihood of fraud based on at least the first transaction time and first geographic location stored in the first authorization request and the second transaction time and second geographic location stored in the second authorization request; and forwarding, by a transmitting device of the processing server, the second authorization request to the different issuer if the determined likelihood of fraud is below a predetermined threshold, or transmitting, by the transmitting device of the processing server, an authorization response for the second payment transaction to the external system indicating decline of the second payment transaction if the determined likelihood of fraud is above the predetermined threshold.

A system for processing an electronic payment transaction includes: an account database of a processing server configured to store an account profile, wherein the account profile includes at least a plurality of primary account numbers and one or more biographical data values, where each of the plurality of primary account numbers is associated with a transaction account and the one or more biographical data values are associated with each of the transaction accounts related to the plurality of primary account numbers; a receiving device of the processing server configured to receive a first authorization request for a first payment transaction, wherein the first authorization request is formatted according to one or more standards and includes a plurality of data elements configured to store transaction data including at least a first primary account number of the plurality of primary account numbers, a first transaction time, and a first geographic location; a transmitting device of the processing server; and the processing server configured to process the first payment transaction, wherein the receiving device of the processing server is further configured to receive a second authorization request for a second payment transaction from an external system, wherein the second authorization request is formatted according to the one or more standards and includes a plurality of data elements configured to store transaction data including at least a second primary account number of the plurality of primary account numbers, a second transaction time, and a second geographic location, where the second primary account number is associated with a transaction account issued by a different issuer than a transaction account associated with the first primary account number, the processing server is further configured to determine a likelihood of fraud based on at least the first transaction time and first geographic location stored in the first authorization request and the second transaction time and second geographic location stored in the second authorization request, and the transmitting device of the processing server is configured to transmit the second authorization request to the different issuer if the determined likelihood of fraud is below a predetermined threshold, or transmit an authorization response for the second payment transaction to the external system indicating decline of the second payment transaction if the determined likelihood of fraud is above the predetermined threshold.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Processing of Electronic Payment Transactions

Figure 1:
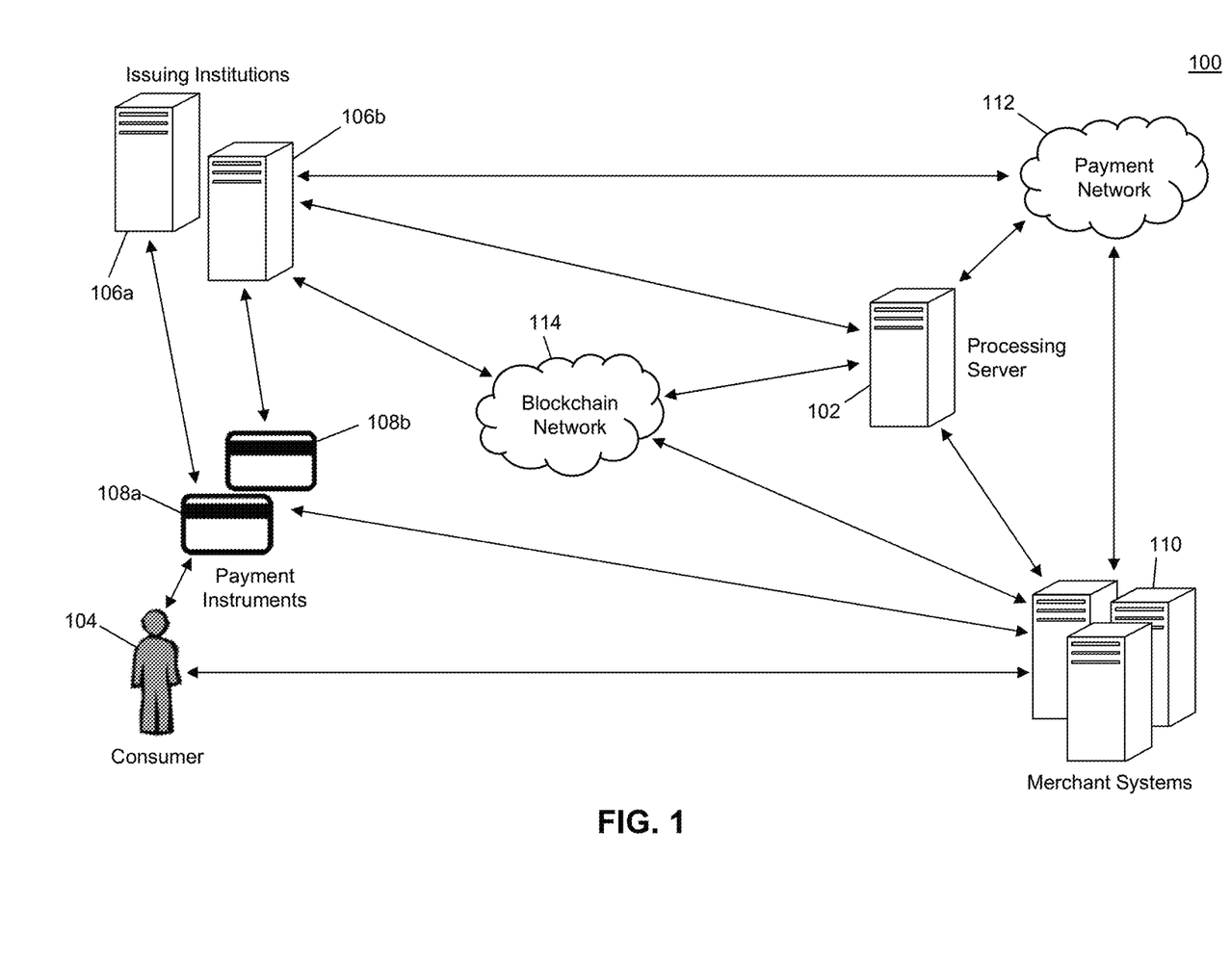
FIG. 1 is a block diagram illustrating a high level system architecture for processing electronic payment transactions in accordance with exemplary embodiments.

FIG. 1 illustrates a system 100 for the processing of electronic payment transactions where authorization is performed on behalf of an issuing institution based on transactional history of a consumer across multiple issuing institutions where, in some cases, blockchain may be used for storage of the transactional history.

The system 100 may include a processing server 102. The processing server 102, discussed in more detail below, may be configured to participate in the processing of electronic payment transactions utilizing transactional history for a consumer 104 across a plurality of different issuing institutions 106, such as the issuing institutions 106a and 106b illustrated in FIG. 1. In the system 100, a consumer 104 may have transaction accounts issued thereto that may be used in the funding of electronic payment transactions by two or more issuing institutions 106. Each issuing institution 106 may issue a transaction account to the consumer 104 and, for each transaction account, may issue one or more payment instruments 108 to the consumer 104, such as the payment instruments 108a and 108b illustrated in FIG. 1. The payment instrument 108 may be encoded with or otherwise used to convey payment credentials associated with the related transaction account. Payment credentials may include, for example, a primary account number and any other data used in the identification and authentication of a transaction account for use in funding an electronic payment transaction, such as a name, expiration date, security code, application cryptogram, transaction counter, etc.

The consumer 104 may use the payment instruments 108 at merchant systems 110 when conducting electronic payment transactions. The consumer 104 may present a payment instrument 108 to a merchant system 110, which may read or otherwise receive payment credentials from the payment instrument. The merchant system 110 may include the payment credentials in transaction data that is submitted to a payment network 112 for processing of the payment transaction. In some embodiments, the merchant system 110 may submit the transaction data directly to the payment network 112 via payment rails associated therewith. In other embodiments, the merchant system 110 may transmit the transaction data to an intermediate entity, such as an acquiring institution or gateway processor, which may submit the transaction data to the payment network 112 via payment rails associated therewith.

As part of the processing of the payment transaction, the payment network 112 may receive an authorization request for the payment transaction. An authorization request may be a type of transaction message indicating that authorization is requested for a related payment transaction. A transaction message may be a specially formatted data message that is formatted according to one or more standards governing the interchange of financial transactional messages, such as the International Organization of Standardization's ISO 8583 or ISO 20022 standards. A transaction message may include a message type indicator indicating a type of the message (e.g., an authorization request, authorization response, etc.) as well as a plurality of data elements, where each data element is configured to store data for the electronic payment transaction. In some cases, the standards and/or one or more bitmaps included in the transaction message may be used to indicate what data elements store what transactional data. Data elements may be configured, for example, to store the primary account number, other payment credentials, a transaction amount, transaction time, transaction date, geographic location, currency type, merchant identification number, acquirer data, issuer data, product data, offer data, reward data, loyalty data, etc. In some cases, the merchant system 110 may generate the authorization request for the electronic payment transaction. In other cases, an intermediate entity (e.g., acquiring institution, gateway processor, etc.) may receive the transaction data from the merchant system 110 and generate the authorization request based thereon.

In a traditional system, the payment network 112 would forward the authorization request to the issuing institution 106 that issued the transaction account used by the consumer 104 to fund the electronic payment transaction, where the issuing institution 106 would approve or deny the payment transaction and electronically transmit an authorization response (e.g., a transaction message with a message type indicator indicating an authorization response) back to the payment network 112. In the system 100, the processing server 102 may receive the authorization request (e.g., directly from the payment network 112 or from the issuing institution 106 after forwarding of the authorization request by the payment network 112) to perform on-behalf processing for the issuing institution 106. The processing server 102 may determine if the transaction should be declined, or if the issuing institution 106 should be contacted for further approval based on past transaction history of the consumer 104 involved in the payment transaction, as discussed in more detail below.

The processing server 102 may be configured to take past authorization requests into account when processing a newly received authorization request for a consumer 104, wherein the past authorization requests may be associated with different issuing institutions 106 (e.g., as indicated via the included primary account numbers). When an authorization request is received by the processing server 102, the authorization request or data included therein may be stored in a profile associated with the consumer 104, discussed in more detail below. The processing server 102 may continue to store authorization requests, or data included therein, for any payment transactions that can be attributed to the consumer 104 regardless of the issuing institution 106. A payment transaction may be attributed to the consumer 104 based on biographical data associated with the transaction account used to fund the payment transaction.

The processing server 102 may be configured to receive biographical information for transaction accounts from associated issuing institutions 106. Biographical information may include any information made available by an issuing institution 106 regarding an authorized user of a transaction account. Such information may include, for example, a name, phone number, e-mail address, computing device identifier, username, social security number, etc. In some cases, each consumer 104 may first provide their consent to the issuing institution 106 for such data to be made available to the processing server 102. In some instances, the biographical information may be anonymized prior to transmission to the processing server 102, or may be anonymized by the processing server 102 upon receipt. For example, a name of the consumer 104 may be provided by the issuing institution 106 as the biographical information for a transaction account, but where the name is hashed such that the consumer's real name is unknown to the processing server 102 and cannot be identified by the processing server 102.

The processing server 102 may receive biographical information for transaction accounts from multiple issuing institutions 106, where the processing server 102 may identify transaction accounts across multiple issuing institutions 106 that are each issued to the consumer 104 or where the consumer 104 is otherwise an authorized user of the transaction account based on the biographical information. For instance, the processing server 102 may receive hashes of names for each transaction account, and may match a transaction account from issuing institution 106a with a transaction account from issuing institution 106b to the consumer 104 because of matching name hashes. Each transaction account that is matched to a consumer 104 may have identifying information thereof (e.g., the primary account number) stored in the consumer's profile.

When a new authorization request is received from the payment network 112 (e.g., or an issuing institution 106, as applicable), the processing server 102 may identify a profile for the consumer 104 involved in the related electronic payment transaction using the primary account number or other identifying information found in the authorization request. The processing server 102 may then determine a likelihood of fraud for the attempted payment transaction based on data included in the new authorization request and data included in one or more prior authorization requests as found in the profile. For instance, in an exemplary embodiment, the processing server 102 may compare a time and geographic location in one or more recent authorization requests with a time and geographic location included in the new authorization request. If the times and locations are such that it would be impossible for the consumer 104 to personally conduct both transactions (e.g., there is one hour between authorization requests but the geographic locations are 1,000 miles apart), then the processing server 102 may determine a high likelihood of fraud. Conversely, if the times and locations are such that it is likely the consumer 104 is involved in the new payment transaction (e.g., the last two authorizations were for transactions in the last hour at the same shopping mall as the new authorization request), then a low likelihood of fraud may be determined. The likelihood of fraud may be represented by the processing server 102 using any suitable method, such as an integer (e.g., on a scale of 1-100), name (e.g., very low, low, high, very high), or other value.

The processing server 102 may then determine if the transaction should be declined. The determination may be based on the likelihood of fraud, and may be further based on criteria set forth by the associated issuing institution 106. For instance, each issuing institution 106 may have a threshold set for on-behalf declines where the processing server 102 may decline any attempted payment transaction where the determined likelihood of fraud is higher than a predetermined value provided by the issuing institution 106. The processing server 102 may identify such a value based on the primary account number used in the new authorization request (e.g., where the issuing institution 106 may be identified therefrom, such as based on a bank identification number, issuer identification number, etc.).

If the processing server 102 determines that the attempted payment transaction should be declined, then the processing server 102 may generate an authorization response for the payment transaction that includes a data element configured to store a response code that indicates that the payment transaction is declined. In some instances, the response code may indicate a decline due to fraud concerns. The processing server 102 may return the authorization response to the payment network 112, which may proceed with any additional processing as necessary using traditional methods. The merchant system 110 may be informed of the transaction decline and may finalize the payment transaction accordingly. In an exemplary embodiment, the authorization request, or data included therein, for the declined payment transaction may be stored in the consumer's profile to be taken into account for future determinations.

If the processing server 102 determines that the payment transaction should not be immediately declined, the processing server 102 may forward the authorization request to the appropriate issuing institution 106. In some cases, the determined likelihood of fraud may be included in the authorization request (e.g., in a data element reserved for private use) or may be transmitted in a data message with the authorization request or in a separate data message. The issuing institution 106 may receive the authorization request and may approve or deny the transaction using traditional methods. As part of the approval or denial, an authorization response indicating thereof (e.g., in a response code stored in a corresponding data element) may be generated by the issuing institution 106. In some cases, the authorization response may be transmitted directly to the payment network 112 via payment rails associated therewith. In other cases, the issuing institution 106 may return the authorization response to the processing server 102, which may forward the authorization response to the payment network 112. The payment transaction may then be finalized accordingly by the payment network 112 and merchant system 110.

In some embodiments, a blockchain may be used to store the transaction data for past payment transactions involving a consumer 104. The blockchain may be maintained by a blockchain network 114, which may be comprised of a plurality of nodes, where each node may be a computing system configured to maintain a copy of the blockchain, generate new blocks, validate blocks generated by other nodes, and perform any additional functions associated with operation and use of the blockchain. In some embodiments, the processing server 102 may be a node in the blockchain network 114.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 114 prior to the generation and addition of a new block to the blockchain in order for the change to be made permanent. Computational and communication limitations may make such a modification exceedingly difficult, if not impossible, thus rendering the blockchain immutable.

Each data value stored in the blockchain may correspond to an authorization request received for a payment transaction. In some cases, there may be a separate blockchain for each consumer 104, where every data value included in that blockchain may be related to an attempted payment transaction involving that consumer. In other cases, a blockchain may store data values for multiple consumers 104. In such cases, each data value may include the account identifier, biographical information, or other value used to identify the consumer 104 and/or profile related therewith. Each data value may include the authorization request or any data included therein that may be used in performing the functions discussed herein. In some embodiments, the processing server 102 may submit any received authorization requests to a node in the blockchain network 114 for inclusion in the blockchain. In other embodiments, an issuing institution 106 may, when an authorization request is received, submit that authorization request to a node in the blockchain network 114. In yet other embodiments, merchant systems 110 or the payment network 112 may be configured to provide authorization requests to nodes in the blockchain network 114 for inclusion on the blockchain during initial processing of the payment transaction. In some embodiments, the blockchain may be a private blockchain such that only the processing server 102 is capable of reading information added to the blockchain, such as to prevent one issuing institution 106a from seeing payment transactions involving a second issuing institution 106b.

The methods and systems discussed herein enable a processing server 102 to process payment transactions on behalf of multiple issuing institutions 106 that each involve a single consumer 104. The use of authorization requests from multiple issuing institutions 106 may provide for a more accurate fraud determination, which may result in greater security for both consumers 104 and issuing institutions 106. The actions being performed by the processing server 102 separate from the issuing institutions 106 ensures that issuing institutions 106 do not need to update their existing systems or risk security or privacy by storing transaction data for other issuing institutions 106. In addition, by the processing server 102 declining fraud-likely payment transactions on behalf of issuing institutions 106, issuing institutions 106 may see less transaction messages, which may decrease network bandwidth and processing power used, thus increasing operating efficiency.

Processing Server

Figure 2:
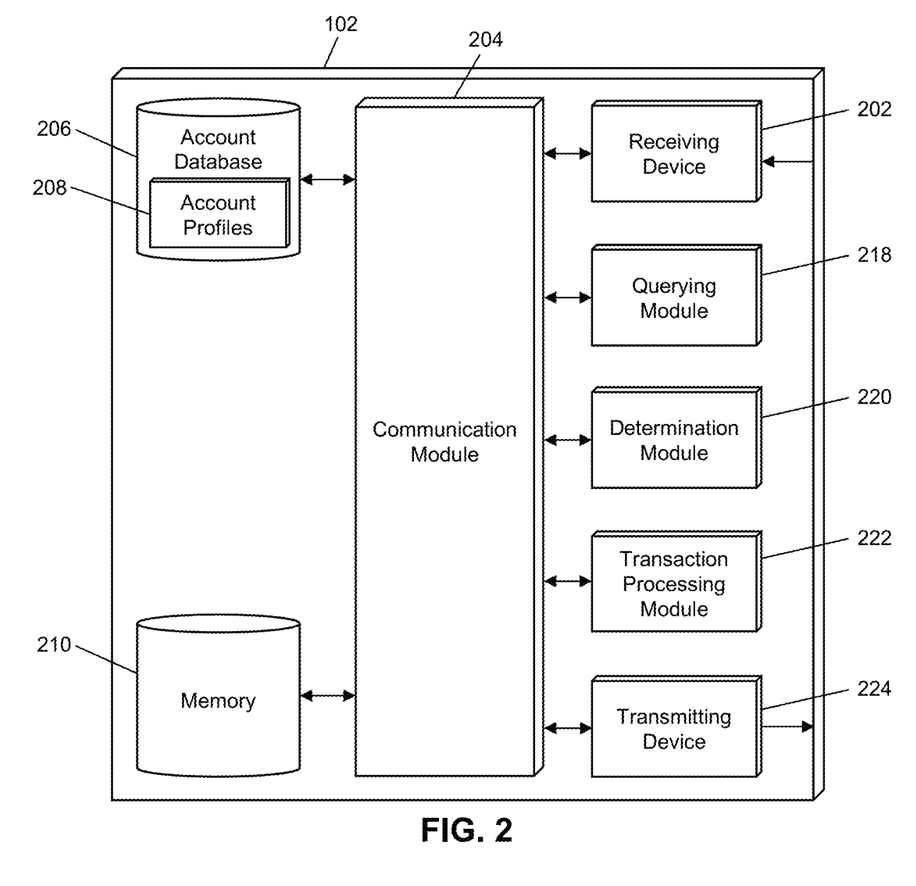
FIG. 2 is a block diagram illustrating the processing server of the system of FIG. 1 for the processing of electronic payment transactions in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 106, merchant systems 110, payment networks 112, blockchain networks 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106 that are superimposed or otherwise encoded with account identifiers and biographical information for transaction accounts issued thereby. The receiving device 202 may also be configured to receive data signals superimposed or otherwise encoded with authorization requests that may be electronically transmitted by issuing institutions 106 or payment networks 112. In some embodiments, the receiving device 202 may be configured to receive data signals electronically transmitted by issuing institutions 106 that are superimposed or otherwise encoded with authorization responses for forwarding to payment networks 112. In embodiments where blockchain is used, the receiving device 202 may be configured to receive data signals electronically transmitted by nodes in the blockchain network 114 that are superimposed or otherwise encoded with new blocks and/or data values included therein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, determination module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a consumer 104. Each account profile 208 may include at least a plurality of primary account numbers or other account identifiers, where each is related to a transaction account issued to the related consumer 104 or where the related consumer 104 is an authorized user thereof. Each account profile 208 may also include biographical information used to identify matching transaction accounts, as well as transaction data and/or authorization requests for past payment transactions, if applicable.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify an account profile 208 related to a consumer 104 involved in an attempted payment transaction to identify recent authorization requests related thereto for use in determining likelihood of fraud for the attempted payment transaction.

The processing server 102 may also include a determination module 220. The determination module 220 may be configured to make determinations for the processing server 102 for use in performing the functions discussed herein. The determination module 220 may receive instructions as input, may make a determination based on the instructions, and may output the determination to one or more modules of the processing server 102. In some cases, the input may include data and/or rules to be used in the determination. In other cases, the determination module 220 may be configured to identify such data based on the instructions. For example, the determination module 220 may be configured to determine likelihood of fraud for an attempted payment transaction based on the data included in an authorization request received for the attempted payment transaction as well as data included in authorization requests for past payment transactions involving the same consumer 104 across multiple issuing institutions 106. For instance, the determination module 220 may compare times and geographic locations across the authorization requests to determine likelihood of fraud. The determination module 220 may also be configured to determine if an attempted payment transaction should be declined or forwarded to an associated issuing institution 106 based on the determined likelihood of fraud and a threshold value, such as may be associated with the associated issuing institution 106.

In some embodiments, the processing server 102 may also include a transaction processing module 222. The transaction processing module 222 may be configured to perform functions related to the processing of electronic payment transactions. For instance, the transaction processing module 222 may be configured generate authorization responses, forward authorization requests and responses, perform value added services, or any other functions associated with the routing and processing of electronic payment transactions.

The processing server 102 may also include a transmitting device 224. The transmitting device 224 may be configured to transmit data over one or more networks via one or more network protocols. In some instances, the transmitting device 224 may be configured to transmit data to issuing institutions 106, merchant systems 110, payment networks 112, blockchain networks 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 106 that are superimposed or otherwise encoded with authorization requests and/or determinations of likelihood of fraud for attempted payment transactions, as well as data signals superimposed or otherwise encoded with requests for biographical information. The transmitting device 224 may also be configured to electronically transmit data signals to payment networks 112 or merchant systems 110 that are superimposed or otherwise encoded with authorization responses for attempted payment transactions. In some embodiments, the transmitting device 224 may be configured to electronically transmit data signals to nodes in a blockchain network 114 that are superimposed or otherwise encoded with authorization request data for inclusion in a new blockchain data value or requests for blockchain data values.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, fraud determination rules, transaction routing data, transaction message formatting standard data, etc.

Process for Processing an Electronic Payment Transaction

Figure 3:
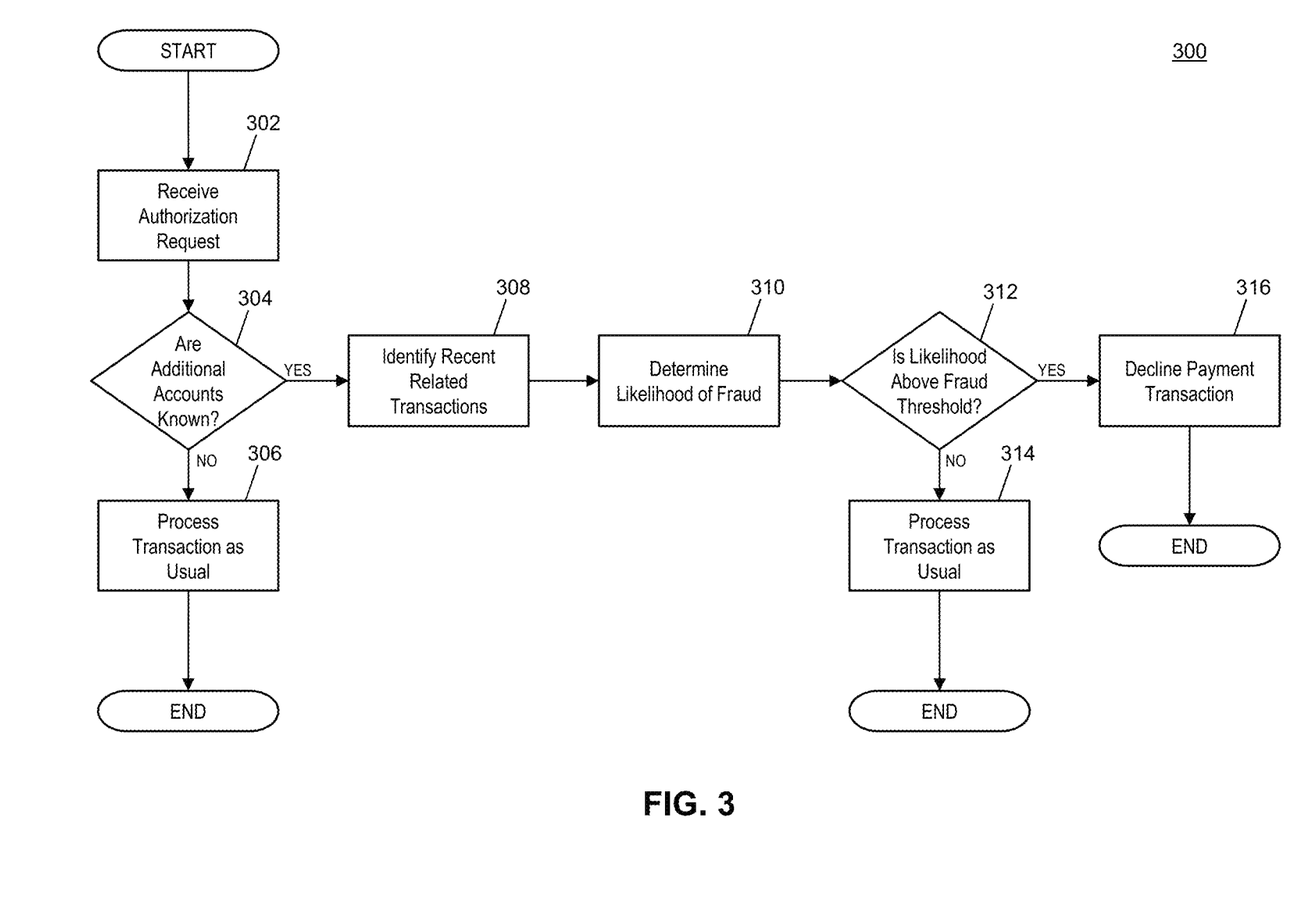
FIG. 3 is a flow diagram illustrating a process for processing electronic payment transactions by the processing server of FIG. 2 in accordance with exemplary embodiments.

FIG. 3 illustrates an example process 300 executed by the processing server 102 in the system 100 for processing an electronic payment transaction on behalf of an issuing institution 106 based on a likelihood of fraud determined using past authorization requests from multiple issuing institutions 106.

In step 302, the receiving device 202 of the processing server 102 may receive an authorization request for an attempted payment transaction, such as may be electronically transmitted by the payment network 112 or an issuing institution 106. The authorization request may be formatted according to one or more standards governing the interchange of financial transaction messages and include a plurality of data elements including data elements configured to store a primary account number, transaction time, and geographic location. In step 304, the processing server 102 may determine if other transaction accounts are known that are issued to the same consumer 104 involved in the payment transaction. Such a determination may be made by executing, by the querying module 218 of the processing server 102, a query on the account database 206 of the processing server 102 to identify an account profile 208 that includes the primary account number included in the received authorization request, and identifying if any other primary account numbers are included in that account profile 208, which may correspond to other transaction accounts including transaction accounts issued by other issuing institutions 106.

If the determination is that there are no other known transaction accounts for the consumer 104, then, in step 306, the transaction processing module 222 may proceed to process the payment transaction using traditional methods. In such cases, the processing server 102 may continue to make a fraud determination based on the one transaction account, or may forward the authorization request on to the issuing institution 106 for processing. If the determination is that other transaction accounts are known, then, in step 308, the processing server 102 may identify recent payment transactions conducted or attempted using the same and other transaction accounts. In some cases, the recent payment transactions may be identified in the account profile 208. In other cases, recent payment transactions may be identified in a transaction database in the processing server 102 used to store transaction data. In yet other cases, the transactions may be identified as data values in a blockchain.

In step 310, the determination module 220 of the processing server 102 may determine a likelihood of fraud for the attempted payment transaction based on data included in the received authorization request as compared to transaction data in the identified related transactions. In an exemplary embodiment, the determination may be based on at least a comparison of the time and geographic location of the attempted payment transaction with the times and locations of the other recent payment transactions involving the consumer 104. In step 312, the determination module 220 of the processing server 102 may determine if the likelihood of fraud is above a threshold value set by the issuing institution 106 that issued the transaction account used in the attempted payment transaction.

If the likelihood of fraud is below the threshold, then, in step 314, the payment transaction may be processed using traditional methods. In such an instance, the transmitting device 224 of the processing server 102 may forward the authorization request to the associating issuing institution 106 for approval or denial. In some cases, the issuing institution 106 may return an authorization response to the processing server 102, which may be received by the receiving device 202 thereof, for forwarding on to the payment network 112 using payment rails associated therewith. If the likelihood of fraud for the attempted payment transaction is above the threshold, then, in step 316, the processing server 102 may decline the payment transaction. The decline may be accomplished by the transaction processing module 222 of the processing server 102 generating an authorization response that includes a data element that stores a response code indicating denial of the payment transaction, which is then electronically transmitted to the payment network 112 by the transmitting device 224 of the processing server 102 using payment rails associated therewith.

Exemplary Method for Processing an Electronic Payment Transaction

Figure 4:
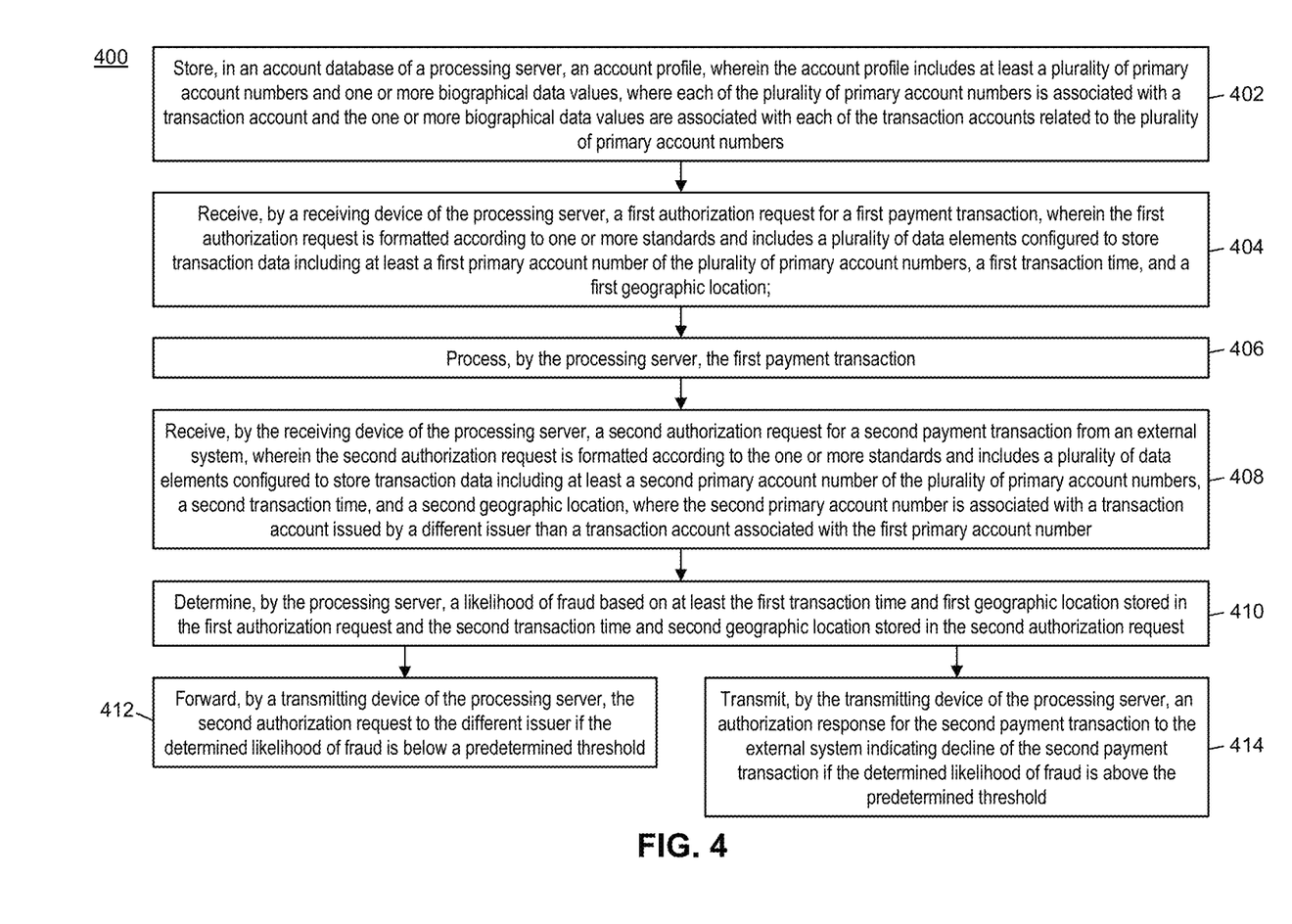
FIG. 4 is a flow chart illustrating an exemplary method for processing an electronic payment transaction in accordance with exemplary embodiments.

FIG. 4 illustrates a method 400 for the processing of an electronic payment transaction by a processing server on behalf of an issuing institution based on a determined likelihood of fraud based on past authorization requests involving other issuing institutions.

In step 402, an account profile (e.g., an account profile 208) may be stored in an account database (e.g., the account database 206) of a processing server (e.g., the processing server 102), wherein the account profile includes at least a plurality of primary account numbers and one or more biographical data values, where each of the plurality of primary account numbers is associated with a transaction account and the one or more biographical data values are associated with each of the transaction accounts related to the plurality of primary account numbers. In step 404, a first authorization request for a first payment transaction may be received by a receiving device (e.g., the receiving device 202) of the processing server, wherein the first authorization request is formatted according to one or more standards and includes a plurality of data elements configured to store transaction data including at least a first primary account number of the plurality of primary account numbers, a first transaction time, and a first geographic location.

In step 406, the first payment transaction may be processed by the processing server (e.g., by the transaction processing module 222 thereof). In step 408, a second authorization for a second payment transaction may be received by the receiving device of the processing server from an external system (e.g., the payment network 112), wherein the second authorization request is formatted according to the one or more standards and includes a plurality of data elements configured to store transaction data including at least a second primary account number of the plurality of primary account numbers, a second transaction time, and a second geographic location, where the second primary account number is associated with a transaction account issued by a different issuer than a transaction account associated with the first primary account number.

In step 410, a likelihood of fraud may be determined by the processing server (e.g., by the determination module 220 thereof) based on at least the first transaction time and first geographic location stored in the first authorization request and the second transaction time and second geographic location stored in the second authorization request. If the determined likelihood of fraud is below a predetermined threshold, then, in step 412, the second authorization request may be electronically transmitted to the different issuer by a transmitting device (e.g., the transmitting device 224) of the processing server. If the determined likelihood of fraud is above the predetermined threshold, then, in step 414, an authorization response for the second payment transaction indicating decline of the second payment transaction may be electronically transmitted, by the transmitting device of the processing server, to the external system.

In one embodiment, the method 400 may further include storing, in a memory (e.g., the memory 210) of the processing server, a blockchain, wherein the blockchain includes a plurality of blocks, each block including at least a block header and one or more transaction data values, wherein the first authorization request is stored in a new block added to the blockchain as a new transaction data value included in the new block prior to receiving the second authorization request. In a further embodiment, the account profile may further include a unique identifier and the new transaction data value may further include the unique identifier. In an even further embodiment, the unique identifier may be a private key of a key pair and the unique identifier may be included in the new transaction data value as a digital signature generated using the private key.

In some embodiments, the first primary account number may include an identification number associated with a first issuing institution (e.g., the issuing institution 106a), and the second primary account number may include an identification number associated with a second issuing institution (e.g., the issuing institution 106b) different from the first issuing institution. In one embodiment, the determination of a likelihood of fraud based on at least the first transaction time and first geographic location stored in the first authorization request and the second transaction time and second geographic location stored in the second authorization request may be further based on an estimated travel time between the first geographic location and the second geographic location compared to a difference in time between the first transaction time and the second transaction time.

In some embodiments, the authorization response may be formatted according to the one or more standards. In a further embodiment, the authorization response may include a plurality of data elements including a data element configured to store a response code indicating decline of the payment transaction due to likelihood of fraud.

Computer System Architecture

Figure 5:
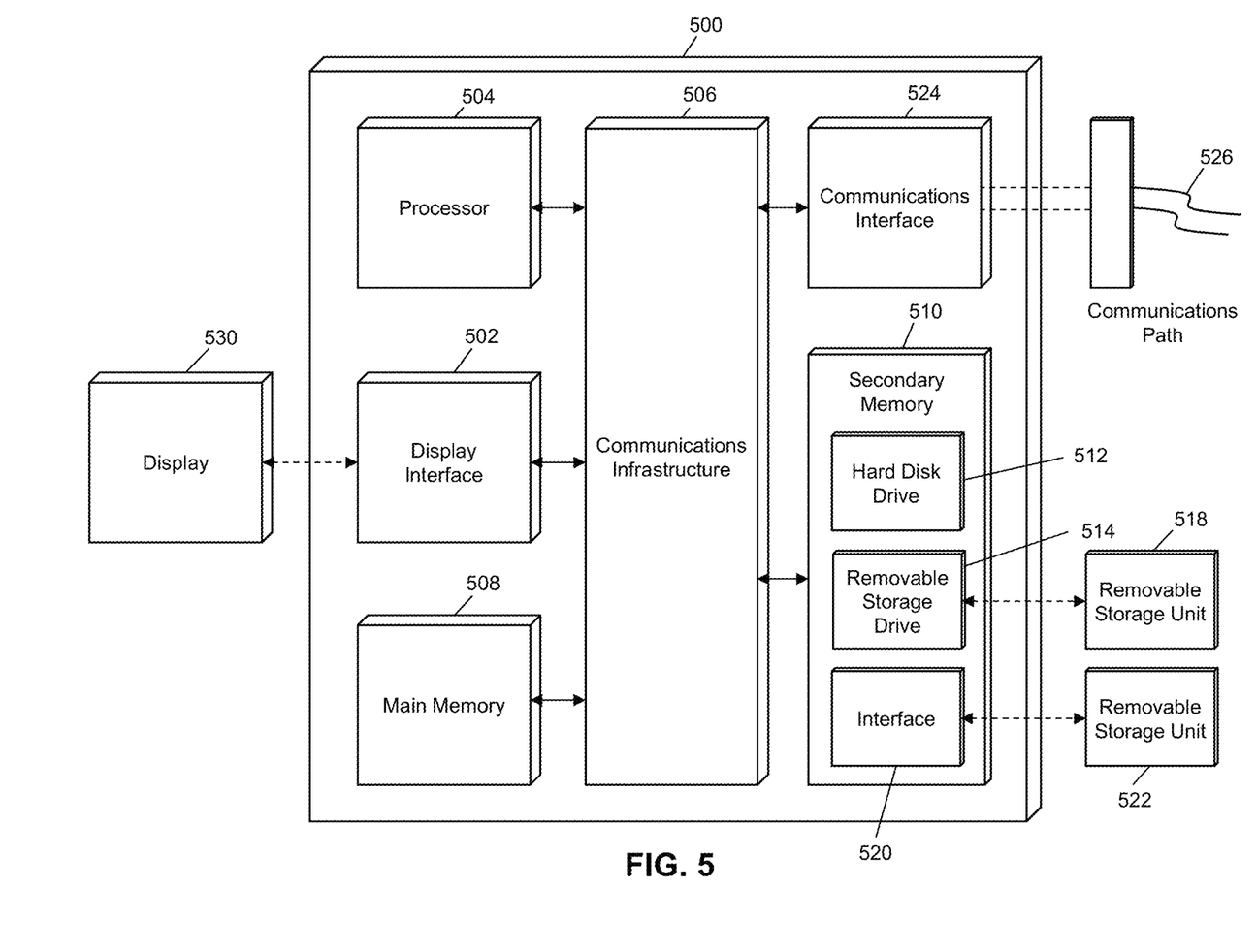
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for processing electronic payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing an electronic payment transaction, comprising:
   storing, in an account database of a processing server, an account profile, wherein the account profile includes at least a plurality of primary account numbers and one or more biographical data values, where each of the plurality of primary account numbers is associated with a transaction account and the one or more biographical data values are associated with each of the transaction accounts related to the plurality of primary account numbers;
   receiving, by a receiving device of the processing server, a first authorization request for a first payment transaction, wherein the first authorization request is formatted according to one or more standards and includes a plurality of data elements configured to store transaction data and the first authorization request for a first payment transaction includes at least a first primary account number of the plurality of primary account numbers, a first transaction time, and a first geographic location;
   processing, by the processing server, the first payment transaction;
   receiving, by the receiving device of the processing server, a second authorization request for a second payment transaction from an external system, wherein the second authorization request is formatted according to the one or more standards and includes a plurality of data elements configured to store transaction data and the second authorization request for a first payment transaction includes at least a second primary account number of the plurality of primary account numbers, a second transaction time, and a second geographic location, where the second primary account number is associated with a transaction account issued by a different issuer than a transaction account associated with the first primary account number;
   determining, by the processing server, a likelihood of fraud based on at least the first transaction time and first geographic location stored in the first authorization request and the second transaction time and second geographic location stored in the second authorization request; and
   forwarding, by a transmitting device of the processing server, the second authorization request to the different issuer if the determined likelihood of fraud is below a predetermined threshold, or
   transmitting, by the transmitting device of the processing server, an authorization response for the second payment transaction to the external system indicating decline of the second payment transaction, prior to the completion of the second payment transaction, if the determined likelihood of fraud is above the predetermined threshold.

2. The method of claim 1, further comprising:
   storing, in a memory of the processing server, a blockchain, wherein the blockchain includes a plurality of blocks, each block including at least a block header and one or more transaction data values, wherein
   the first authorization request is stored in a new block added to the blockchain as a new transaction data value included in the new block prior to receiving the second authorization request.

3. The method of claim 2, wherein
   the account profile further includes a unique identifier, and
   the new transaction data value further includes the unique identifier.

4. The method of claim 3, wherein
   the unique identifier is a private key of a key pair, and
   the unique identifier is included in the new transaction data value as a digital signature generated using the private key.

5. The method of claim 1, wherein
   the first primary account number includes an identification number associated with a first issuing institution, and
   the second primary account number includes an identification number associated with a second issuing institution different from the first issuing institution.

6. The method of claim 1, wherein the determination of a likelihood of fraud based on at least the first transaction time and first geographic location stored in the first authorization request and the second transaction time and second geographic location stored in the second authorization request is further based on an estimated travel time between the first geographic location and the second geographic location compared to a difference in time between the first transaction time and the second transaction time.

7. The method of claim 1, wherein the authorization response is formatted according to the one or more standards.

8. The method of claim 7, wherein the authorization response includes a plurality of data elements including a data element configured to store a response code indicating decline of the payment transaction due to likelihood of fraud.

9. A system for processing an electronic payment transaction, comprising:
   an account database of a processing server configured to store an account profile, wherein the account profile includes at least a plurality of primary account numbers and one or more biographical data values, where each of the plurality of primary account numbers is associated with a transaction account and the one or more biographical data values are associated with each of the transaction accounts related to the plurality of primary account numbers;
   a receiving device of the processing server configured to receive a first authorization request for a first payment transaction, wherein the first authorization request is formatted according to one or more standards and includes a plurality of data elements configured to store transaction data and the first authorization request for a first payment transaction includes at least a first primary account number of the plurality of primary account numbers, a first transaction time, and a first geographic location;

a transmitting device of the processing server; and the processing server configured to process the first payment transaction, wherein the receiving device of the processing server is further configured to receive a second authorization request for a second payment transaction from an external system, wherein the second authorization request is formatted according to the one or more standards and includes a plurality of data elements configured to store transaction data and the second authorization request for a first payment transaction includes at least a second primary account number of the plurality of primary account numbers, a second transaction time, and a second geographic location, where the second primary account number is associated with a transaction account issued by a different issuer than a transaction account associated with the first primary account number, the processing server is further configured to determine a likelihood of fraud based on at least the first transaction time and first geographic location stored in the first authorization request and the second transaction time and second geographic location stored in the second authorization request, and the transmitting device of the processing server is configured to transmit the second authorization request to the different issuer if the determined likelihood of fraud is below a predetermined threshold, or transmit an authorization response for the second payment transaction to the external system indicating decline of the second payment transaction, prior to the completion of the second payment transaction, if the determined likelihood of fraud is above the predetermined threshold.

10. The system of claim 9, further comprising:

a memory of the processing server configured to store a blockchain, wherein the blockchain includes a plurality of blocks, each block including at least a block header and one or more transaction data values, wherein the first authorization request is stored in a new block added to the blockchain as a new transaction data value included in the new block prior to receiving the second authorization request.

11. The system of claim 10, wherein the account profile further includes a unique identifier, and the new transaction data value further includes the unique identifier.

12. The system of claim 11, wherein the unique identifier is a private key of a key pair, and the unique identifier is included in the new transaction data value as a digital signature generated using the private key.

13. The system of claim 9, wherein the first primary account number includes an identification number associated with a first issuing institution, and the second primary account number includes an identification number associated with a second issuing institution different from the first issuing institution.

14. The system of claim 9, wherein the determination of a likelihood of fraud based on at least the first transaction time and first geographic location stored in the first authorization request and the second transaction time and second geographic location stored in the second authorization request is further based on an estimated travel time between the first geographic location and the second geographic location compared to a difference in time between the first transaction time and the second transaction time.

15. The system of claim 9, wherein the authorization response is formatted according to the one or more standards.

16. The system of claim 15, wherein the authorization response includes a plurality of data elements including a data element configured to store a response code indicating decline of the payment transaction due to likelihood of fraud.

* * * * *